US011873667B1

(12) United States Patent
Waites

(10) Patent No.: US 11,873,667 B1
(45) Date of Patent: Jan. 16, 2024

(54) DOOR HANDLE AND LOCKING SYSTEM

(71) Applicant: Global Link Distribution, Corp., Elkhart, IN (US)

(72) Inventor: Christopher J. Waites, Frankenmuth, MI (US)

(73) Assignee: Global Link Distribution, Corp., Elkhart, IN (US)

( * ) Notice: Subject to any disclaimer, the term of this patent is extended or adjusted under 35 U.S.C. 154(b) by 590 days.

(21) Appl. No.: 16/987,545

(22) Filed: Aug. 7, 2020

Related U.S. Application Data

(60) Provisional application No. 62/883,997, filed on Aug. 7, 2019.

(51) Int. Cl.
*E05B 77/04* (2014.01)
*E05B 85/10* (2014.01)
*E05B 83/44* (2014.01)

(52) U.S. Cl.
CPC .............. *E05B 77/04* (2013.01); *E05B 85/10* (2013.01); *E05B 83/44* (2013.01)

(58) Field of Classification Search
CPC .......... E05B 77/04; E05B 77/06; E05B 85/10; E05B 83/44; E05B 79/10
USPC ........................................................ 292/336.3
See application file for complete search history.

(56) References Cited

U.S. PATENT DOCUMENTS

| | | | | |
|---|---|---|---|---|
| 2013/0221690 A1* | 8/2013 | Rocci | E05B 85/16 292/336.3 |
| 2014/0292005 A1* | 10/2014 | Bendel | E05B 85/10 292/336.3 |
| 2015/0123410 A1* | 5/2015 | Kang | E05B 85/16 292/336.3 |
| 2016/0168891 A1 | 6/2016 | McKinnon et al. | |
| 2018/0016820 A1* | 1/2018 | Takagi | E05B 81/06 |
| 2019/0301208 A1* | 10/2019 | Cimpean | E05B 77/04 |
| 2020/0040616 A1* | 2/2020 | Hu | E05B 79/06 |

FOREIGN PATENT DOCUMENTS

| | | | |
|---|---|---|---|
| JP | 2017031739 A * | 2/2017 | |
| WO | WO-0011295 A1 * | 3/2000 | E05B 77/265 |

* cited by examiner

*Primary Examiner* — Kristina R Fulton
*Assistant Examiner* — James Edward Ignaczewski
(74) *Attorney, Agent, or Firm* — Barnes & Thornburg LLP

(57) ABSTRACT

A door handle and locking system includes a base, a latching mechanism, a handle, a safety latch mechanism, and a biasing member having a biasing force. The latching mechanism is movable from a latched position to an unlatched position. The handle is connected to the base and is movable in response to a first force from a first position to a second position. Moving the handle from the first position to the second position moves the latching mechanism from the latched position to the unlatched position. The safety latch mechanism moves from a first position to a second position upon application of a force to the biasing member exceeding the biasing force. The safety latch mechanism remains in the first position upon movement of the handle from the first position to the second position.

12 Claims, 9 Drawing Sheets

DOOR HANDLE AND LOCKING SYSTEM

This application claims priority of U.S. Provisional Patent Application No. 62/883,997 filed Aug. 7, 2019.

The present invention relates to a door handle and locking system and, in particular, to a door handle and locking system for a vehicle.

BACKGROUND OF THE INVENTION

Certain safety standards, such as United States Federal Motor Vehicle Safety Standards, may require vehicle door latches to remain engaged under certain forces that may be experienced in an accident or during operation of the vehicle. For example, one FMVSS standard requires a vehicle door latch to remain engaged at up to 30 G force acting on the vehicle door handle in the X, Y and Z directions as defined by the handle's orientation in relation to the vehicle door.

SUMMARY OF THE INVENTION

In one embodiment of the present invention, a door handle and locking system includes a base, a first latching mechanism, a handle, a safety latch and a first biasing member. The first latching mechanism is movable from a latched position to an unlatched position. The handle is connected to the base and is moveable from a first position in which the first latching mechanism is in the latched position to a second position in which the first latching mechanism is in the unlatched position. The safety latch mechanism is movable from a first position to a second position and has a body having a first end, a second end, a first post extending from the body, and a second post extending from the body. The first and second posts connect the safety latch mechanism to the base such that the safety latch mechanism is rotatable about the first and second posts from the first position to the second position. The first biasing member has a biasing force and biases the safety latch mechanism in the first position when the handle is in the first position. The first latching mechanism has a first cam mechanism, an actuator mechanism, a second cam mechanism, and a rotary mechanism. The first cam mechanism has a shaft having a projection extending therefrom. The actuator mechanism has a first end having a first projection extending therefrom, a second end having a second projection extending therefrom, and a third projection. The actuator mechanism is movable from a first position in which the first latching mechanism is in the latched position to a second position in which the first latching mechanism is in the unlatched position. The second cam mechanism has a first arm, a second arm, a first opening, a second opening, and a second biasing member having a projection extending into the first opening of the second cam mechanism. A third biasing member biases the second biasing member in a first position when the handle is in the first positon. The rotary mechanism has a latch actuation mechanism, an actuator arm having a first projection extending through the second opening in the second cam mechanism, and a second projection that engages the latch actuation mechanism. Moving the handle from the first position to the second position rotates the first cam mechanism so as to move the projection of the first cam mechanism into contact with the first projection of the actuator mechanism, thereby moving the actuator mechanism from the first position to the second position so as to engage the second projection of the actuator mechanism with the first arm of the second cam mechanism, thereby rotating the second cam mechanism such that the second cam mechanism bears against the first projection of the actuator arm to rotate the actuator arm such that the second projection of the actuator arm engages the latch actuation mechanism to move the first latching mechanism from the latched position to the unlatched position. The safety latch mechanism remains in the first position upon movement of the handle from the first position to the second position.

In one embodiment, applying force to the safety latch mechanism sufficient to overcome the biasing force of the first biasing member moves the safety latch mechanism from the first position to the second position.

In another embodiment, applying force to the safety latch mechanism sufficient to overcome the biasing force of the first biasing member causes the safety latch mechanism to rotate about the first and second posts so as to position the second end of the safety latch mechanism so as to prevent movement of the actuator mechanism from the first position to the second position. In other embodiments, when the safety latch mechanism is in the second position, the third projection of the actuator mechanism engages the second end of the safety latch mechanism as the actuator mechanism moves from the first position to the second position.

In certain embodiments, the force required to move the handle from the first position to the second position is greater than the biasing force of the first biasing member. In one embodiment, the force required to move the handle from the first position to the second position is 13 G. In another embodiment, the biasing force of the first biasing member is 3 G.

In certain embodiments, the he handle has a first end and a second end, the first end being movable away from the base as the handle moves from the first position to the second position and the second end being movable toward the base as the handle moves from the first position to the second position.

In certain embodiments, the third projection of the actuator mechanism is located adjacent the second end of the actuator mechanism.

In one embodiment, rotation of the second cam mechanism in response to movement of the handle from the first position to the second position rotates the second biasing member, which in turn applies force to the third biasing member.

In other embodiments, the first and second posts of the safety latch mechanism are located closer to the second end of the safety latch mechanism than they are to the first end of the safety latch mechanism.

In one embodiment, the mass of the safety latch mechanism between the first and second posts and the first end of the safety latch mechanism is greater than the mass of the safety latch mechanism between the first and second posts and the second end of the safety latch mechanism.

In one embodiment of the present invention, a door handle and locking system includes a base, a latching mechanism, a handle, a safety latch mechanism, and a biasing member. The latching mechanism is movable from a latched position to an unlatched position. The handle is connected to the base and is movable in response to a first force from a first position to a second position. The safety latch mechanism is movable from a first position to a second position. The biasing member has a biasing force and biases the safety latch mechanism in the first position. The safety latch mechanism moves from the first position to the second position upon application of a force to the biasing member exceeding the biasing force. Moving the handle from the first position to the second position moves the latching mechanism from the latched position to the unlatched position. The safety latch mechanism remains in the first position upon movement of the handle from the first position to the second position.

In another embodiment, the first force is greater than the biasing force of the biasing member. In one embodiment, the first force is 13 G. In another embodiment, the biasing force of the biasing member is 3 G.

In another embodiment, movement of the safety latch mechanism from the first position to the second position prevents movement of the latching mechanism from the latched position to the unlatched position.

In on embodiment, the safety latch mechanism has a body having a first end, a second end, a first post extending from the body, and a second post extending from the body. The first and second posts connect the safety latch mechanism to the base such that the safety latch mechanism is rotatable about the first and second posts from the first position to the second position.

In another embodiment, the first and second posts of the safety latch mechanism are located closer to the second end of the safety latch mechanism than they are to the first end of the safety latch mechanism.

In certain embodiments, the mass of the safety latch mechanism between the first and second posts and the first end of the safety latch mechanism is greater than the mass of the safety latch mechanism between the first and second posts and the second end of the safety latch mechanism.

Other features of the present invention will be apparent from a the following description of embodiments of the invention and the accompanying drawings.

DETAILED DESCRIPTION OF EMBODIMENTS OF THE INVENTION

Figure 1:
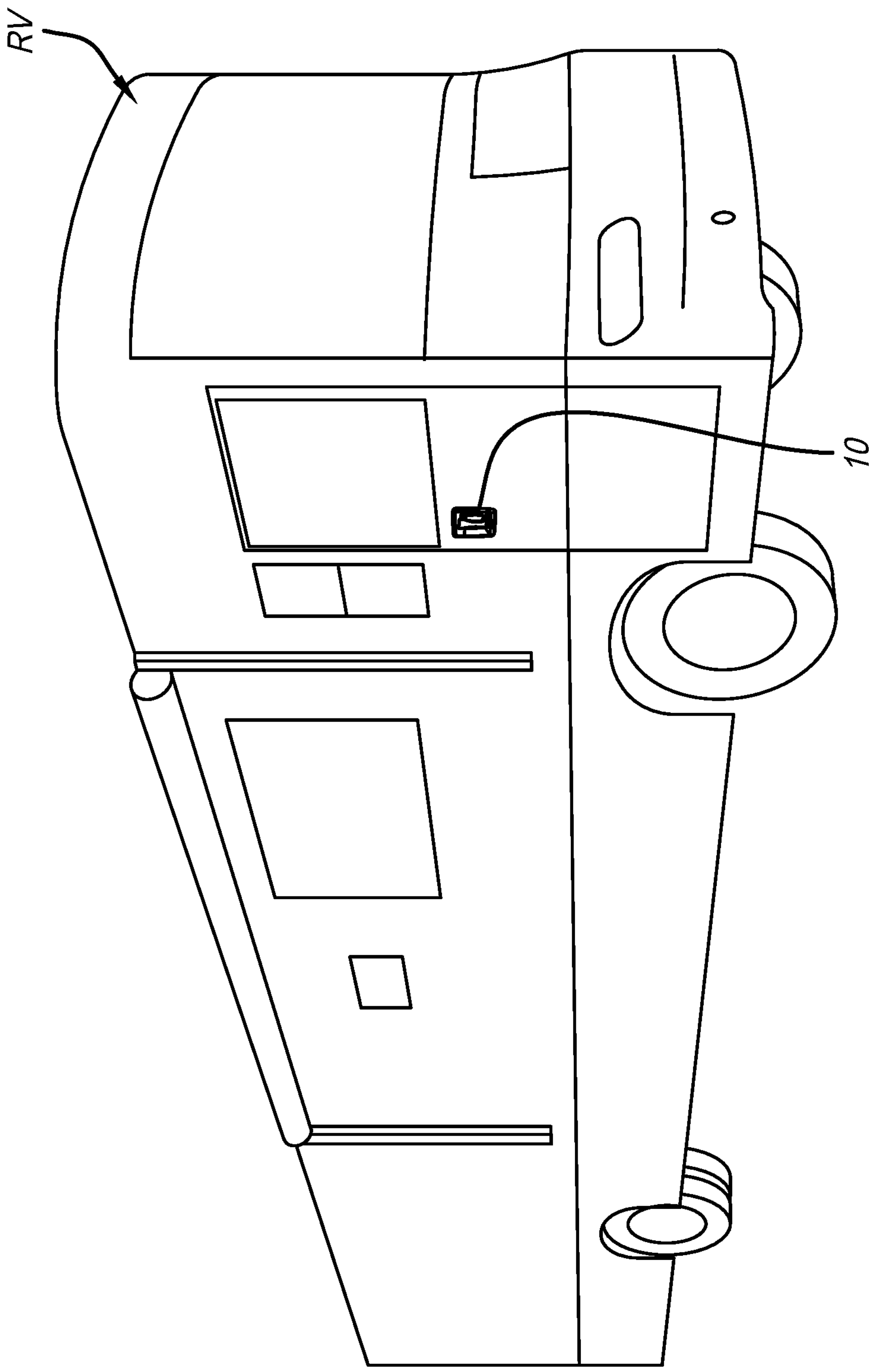
FIG. 1 is a perspective view of a recreational vehicle equipped with a door handle and locking system according to one embodiment of the present invention.
Figure 2:
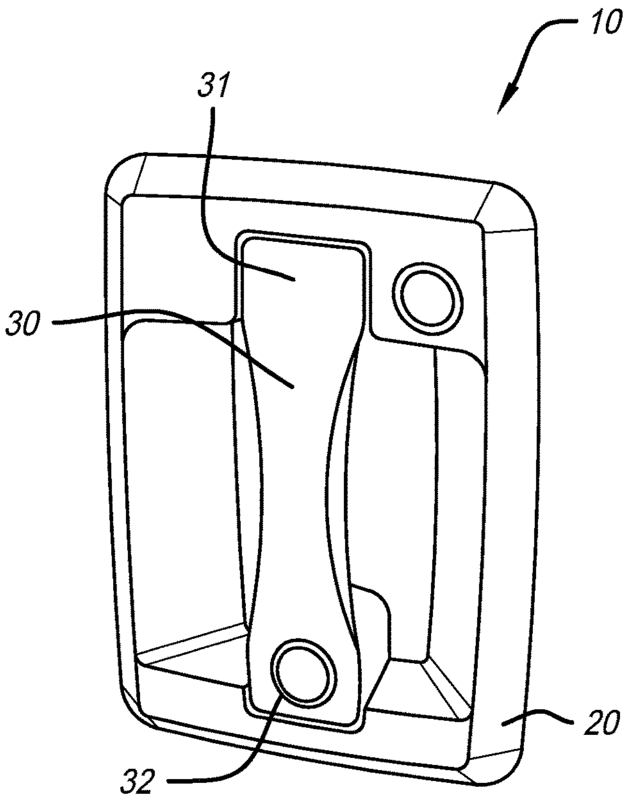
FIG. 2 is a perspective view of a door handle and locking system according to one embodiment of the present invention.
Figure 3:
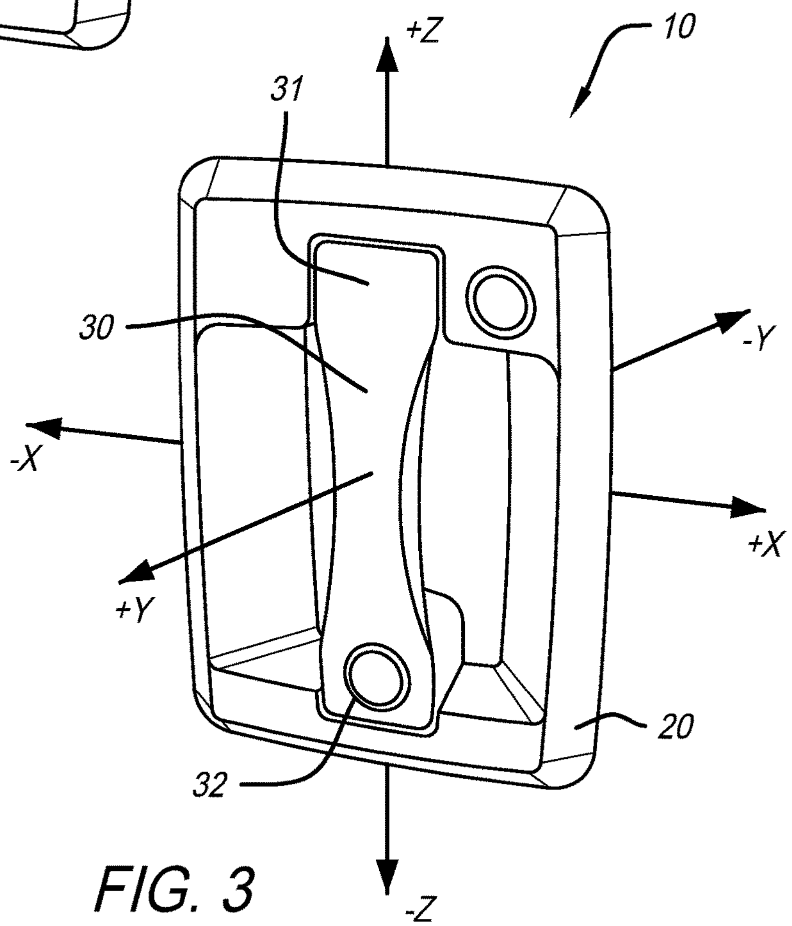
FIG. 3 is a perspective view of the door handle and locking system shown in FIG. 2 illustrating the X, Y and Z axis of the door handle and locking system shown in FIG. 2.

FIG. 1 is a perspective view of a recreational vehicle RV equipped with a door handle and locking system 10 according to one embodiment of the present invention. FIG. 2 is a perspective view of door handle and locking system 10. Solely for purposes of describing and illustrating door handle and locking system 10, FIG. 3 is a perspective view of door handle and locking system 10 with directional axes X, Y and Z indicated.

Figure 4:
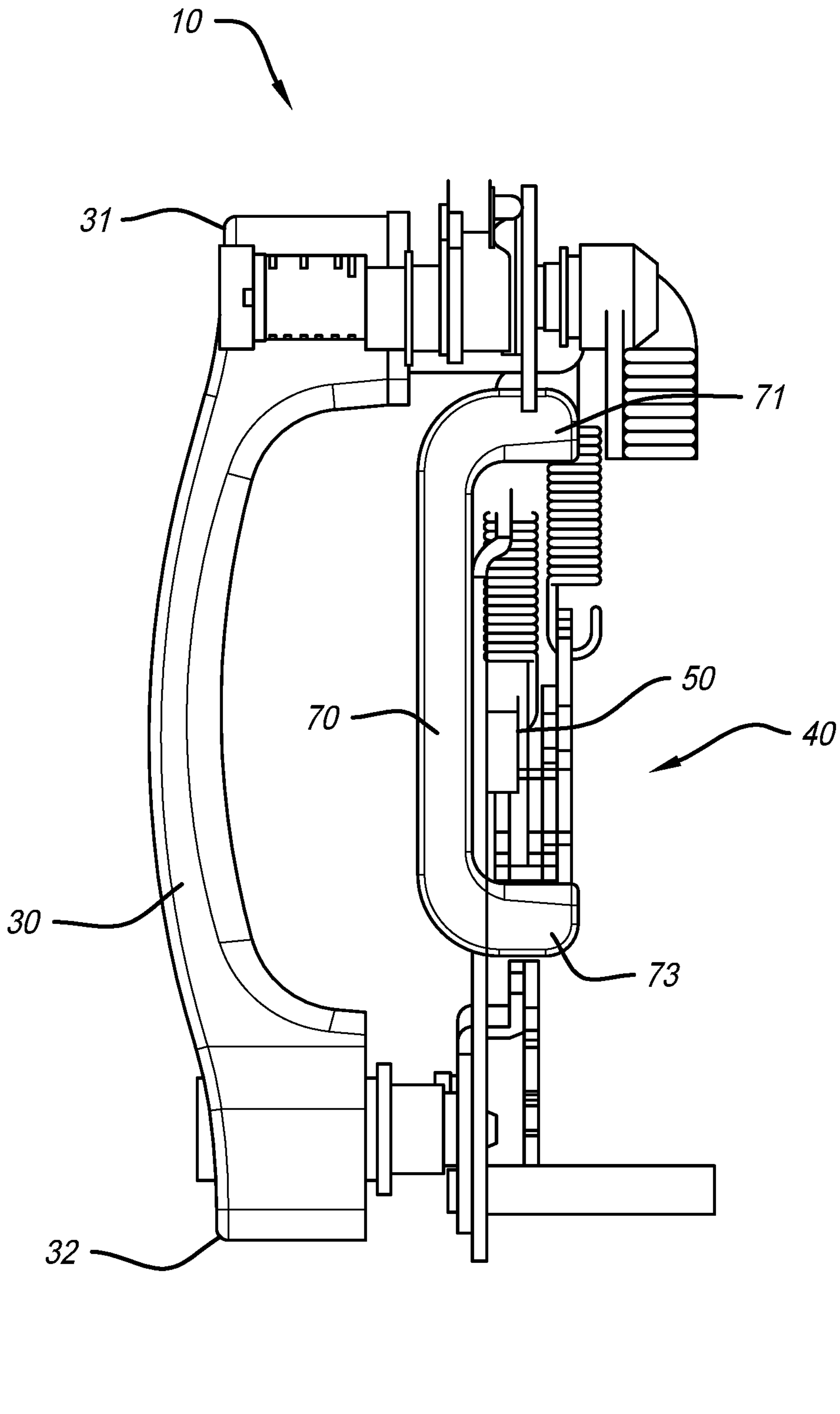
FIG. 4 is a side view of certain components of the door handle and locking system shown in FIG. 2.

As shown in FIGS. 1-4, door handle and locking system 10 generally includes a base 20, a handle 30, a latching mechanism 40 and a safety latch mechanism 50. Note that FIG. 4 illustrates door handle and locking system 10 with base 20 removed so as to make internal components of door handle and locking system 10 visible.

Handle 30 includes a first end 31 and a second end 32. Handle 30 is connected to base 20 so as to permit first end 31 to be pulled away from base 20 and to move second end 32 toward base 20 so as to activate latching mechanism 40 to permit the door to which door handle and locking system 10 is attached to be opened.

As shown in FIGS. 4-8, latching mechanism 40 is supported by base 20. In the embodiment shown, latching mechanism 40 includes a first cam mechanism 60, an actuator mechanism 70, a second cam mechanism 80, and a rotary mechanism 90.

Figure 6:
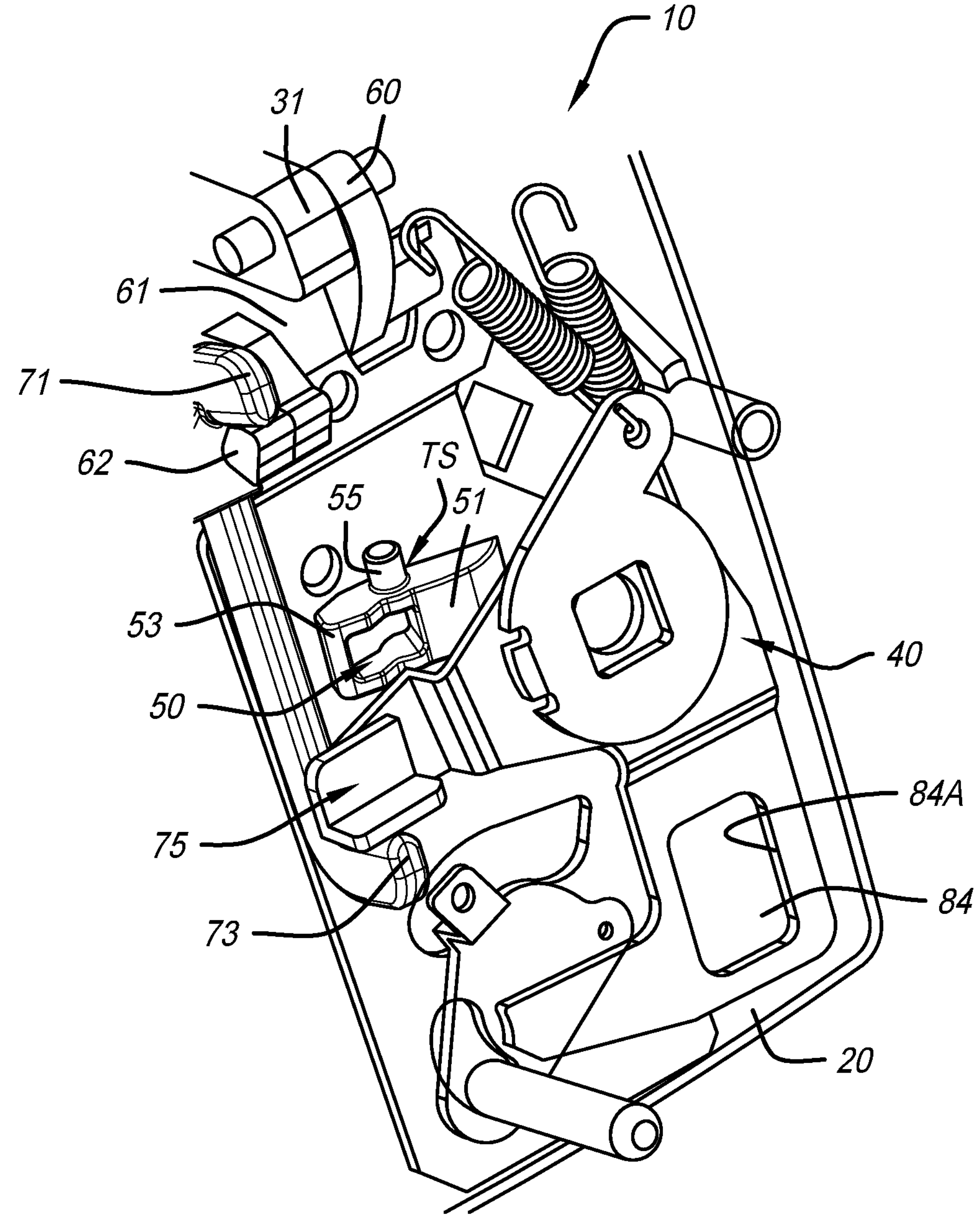
FIG. 6 is a perspective view of certain components of the door handle and locking system shown in FIG. 2.
Figure 7:
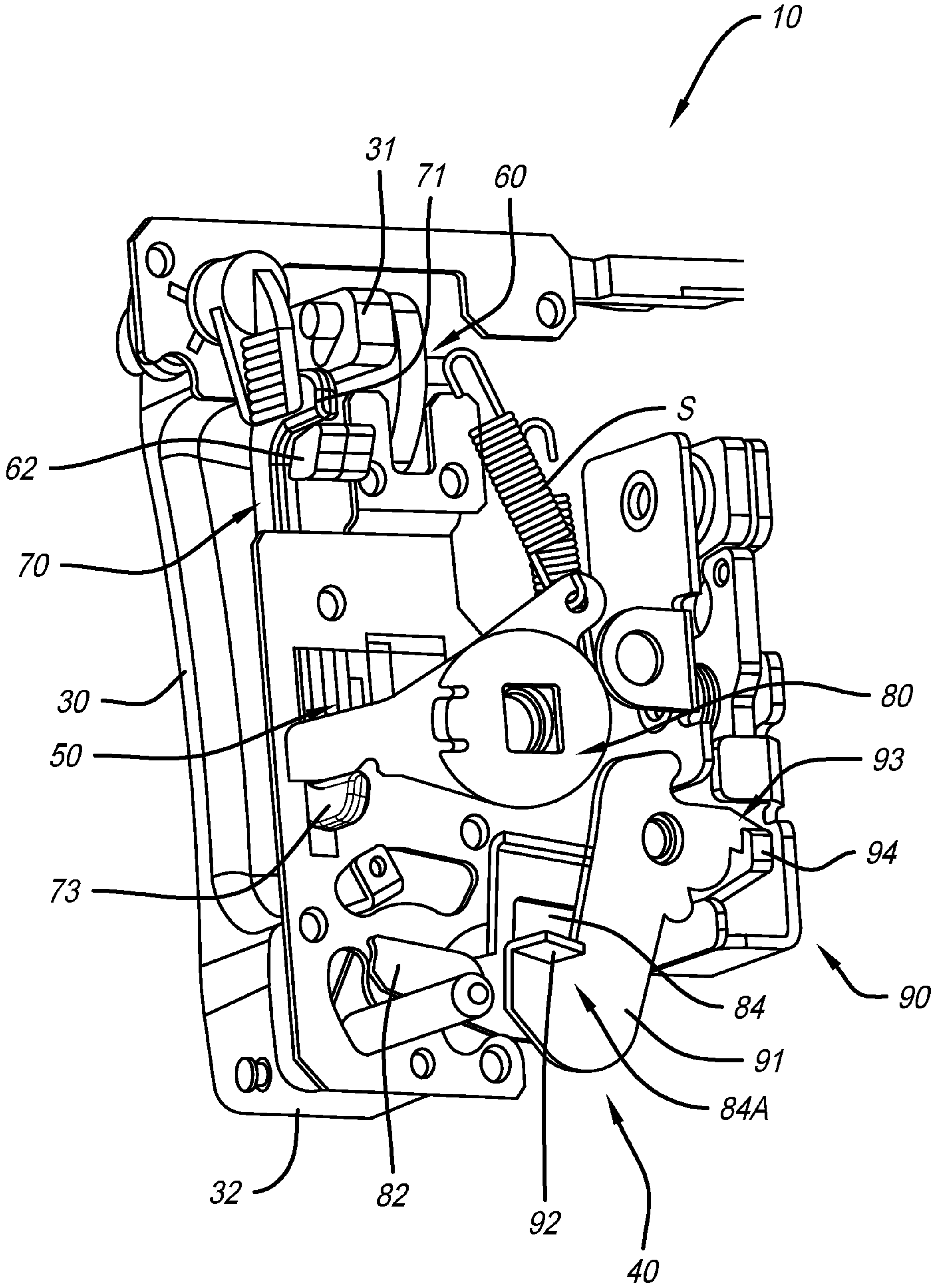
FIG. 7 is a perspective view of certain components of the door handle and locking system shown in FIG. 2.
Figure 8:
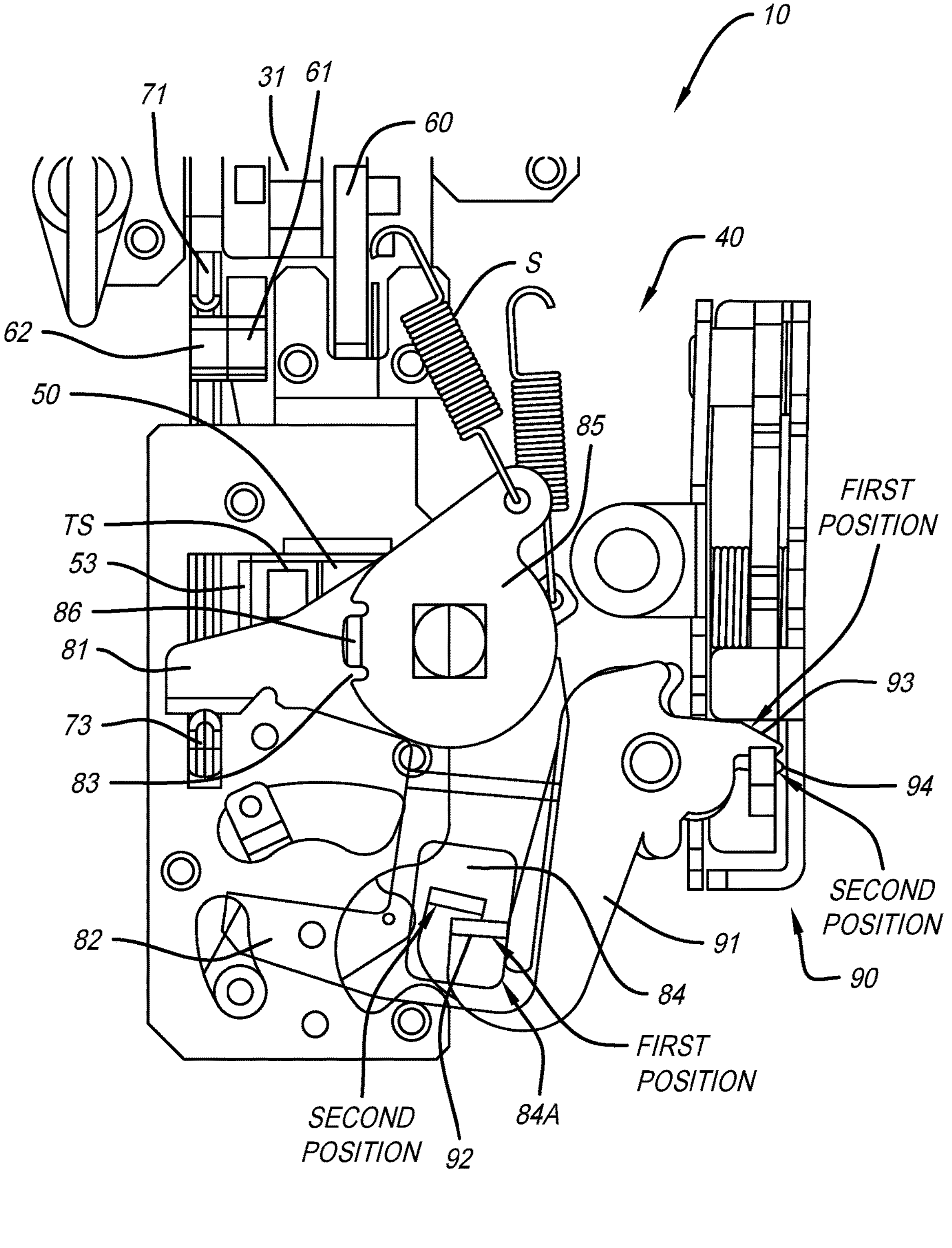
FIG. 8 is an elevational view of certain components of the door handle and locking system shown in FIG. 2.

In the embodiment shown, first cam mechanism 60 includes a shaft 61 having a projection 62 extending therefrom (FIGS. 6-8).

Figure 9:
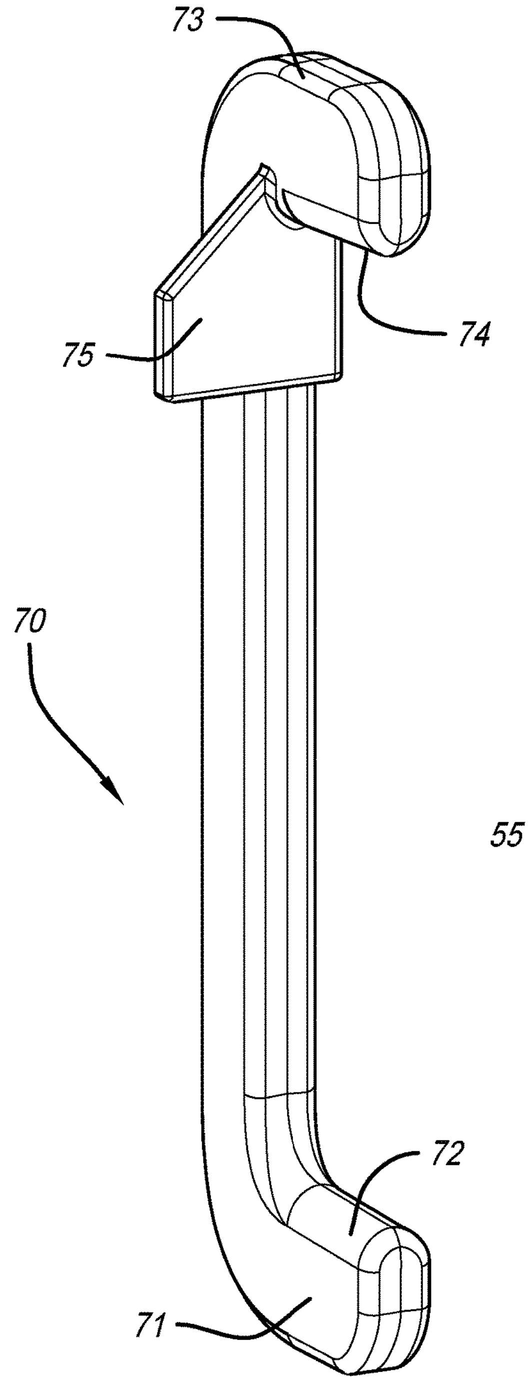
FIG. 9 is a perspective view of an actuator mechanism that is a component of the door handle and locking system shown in FIG. 2.

Actuator mechanism 70 (FIG. 9) is a generally C-shaped member having a first end 71 with a projection 72 extending therefrom, a second end 73 with a projection 74 extending therefrom, and a tab or projection 75. In the embodiment, shown tab or projection 75 is positioned adjacent second end 73 of actuator mechanism 70.

Second cam mechanism 80 in the embodiment shown is a generally C or a U-shaped member having a first arm 81, a second arm 82, a first opening 83, a second opening 84 having a side edge 84A, and a biasing member 85 having a projection 86 extending into first opening 83. A spring S biases biasing member 85 in the position shown in FIG. 2 when handle 30 is in the unactuated positon.

Rotary mechanism 90 (FIGS. 7 and 8) generally includes an actuator arm 91 having a first projection 92 that extends through second opening 84 in second cam mechanism 80 and a second projection 93 that engages a latch actuation mechanism 94.

Figure 10:
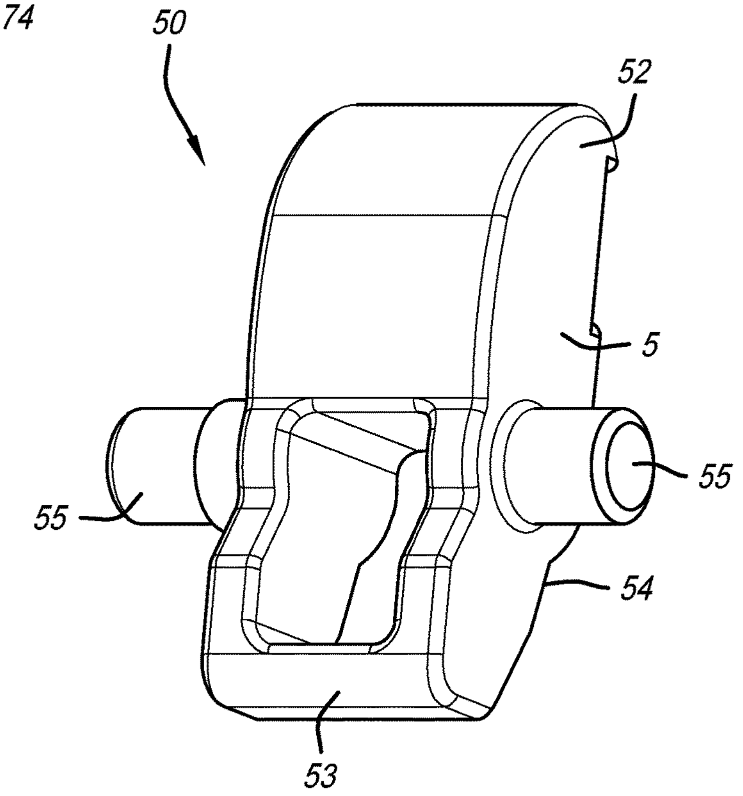
FIG. 10 is a perspective view of a safety latch mechanism that is a component of the door handle and locking system shown in FIG. 2.
Figure 11:
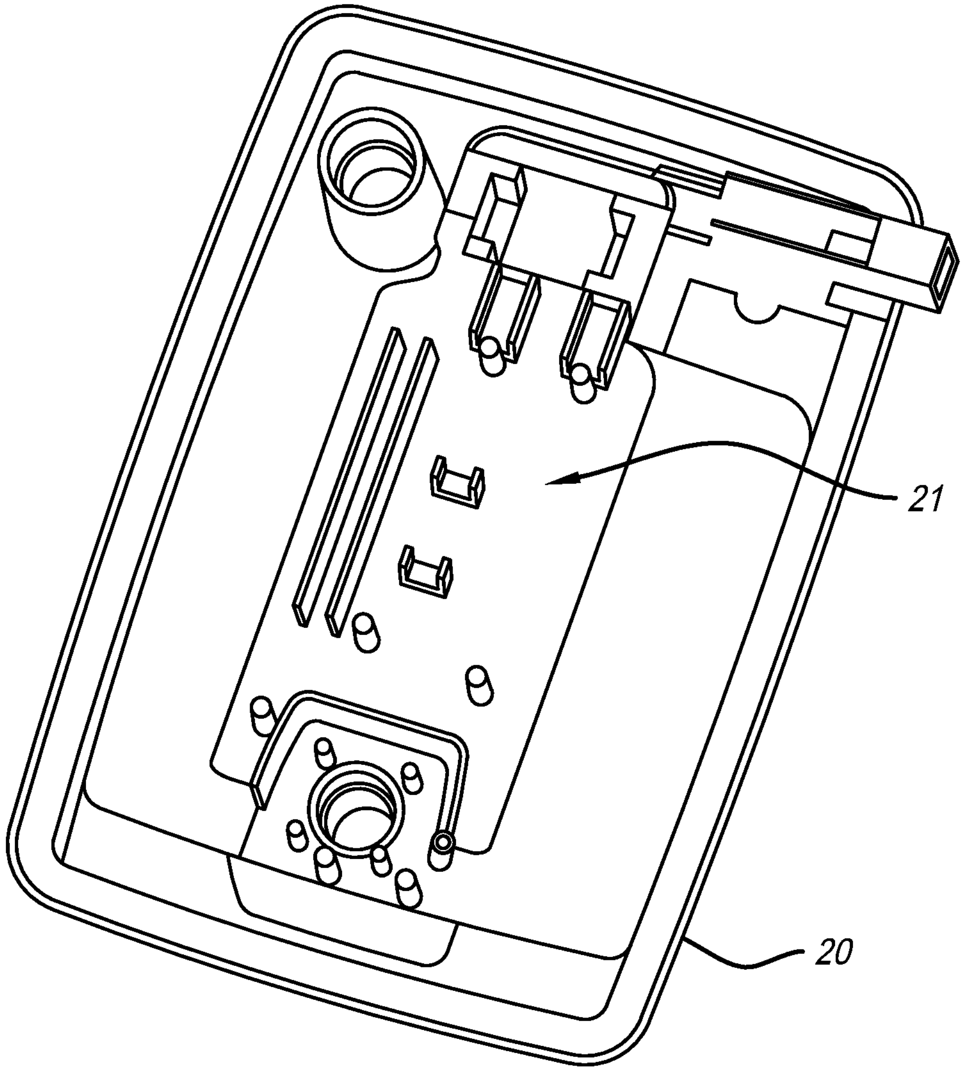
FIG. 11 is a perspective view of a base that is a component of the door handle and locking system shown in FIG. 2.

Safety latch mechanism 50 (FIG. 10) includes a body 51 having a first end 52, a second end 53, an opening 54, and a pair of posts or pins 55 extending from body 51. Note that in the embodiment shown, pins or posts 55 are positioned closer to second end 53 than to first end 52. Note also that safety latch mechanism 50 is configured such that the mass of safety latch mechanism 50 between pins or posts 55 and first end 52 is greater than the mass of safety latch mechanism 50 between pins or posts 55 and second end 53. Safety latch mechanism 50 is secured in base 20 by engaging pins or posts 55 with retaining members 21 in base 20. Safety latch mechanism 50 is secured in to base 20 in a manner that permits it to rotate about pins or posts 55. A torsion spring TS is positioned around one of the posts or pins 55. Torsion spring TS biases safety latch mechanism 50 into the position shown in FIG. 6 when handle 30 is in the unactuated position.

Figure 5:
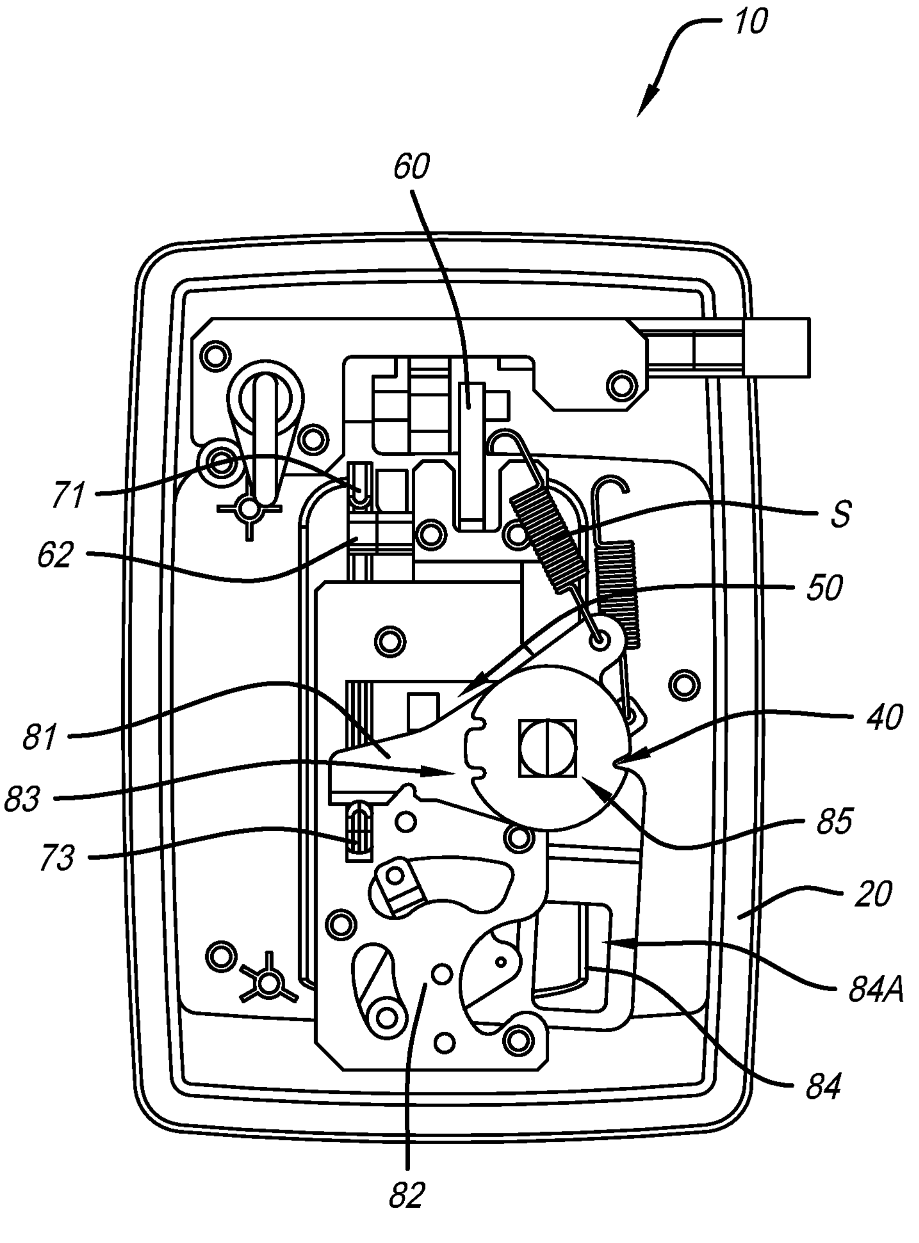
FIG. 5 is an elevational view of certain components of the door handle and locking system shown in FIG. 2.

In operation, the vehicle door can be unlatched and opened by pulling on handle 30 so as to move first end 31 away from base 20. This causes rotation of first cam mechanism 60 and shaft 61, which causes upward movement of projection 62. As projection 62 moves upward, it draws actuator mechanism 70 upward by means of the engagement of projection 62 with projection 72 on first end 71 of actuator mechanism 70. As actuator mechanism 70 is drawn upwardly, projection 74 on second end 73 engages first arm 81 of second cam mechanism 80, thereby causing second cam mechanism 80 to rotate in a clockwise direction. As second cam mechanism 80 rotates, side edge 84A of second opening 84 bears against first projection 92 of actuator arm 91 to rotate actuator arm 91 in a clockwise direction so that first projection 92 moves from a first position to a second position in which first projection 92 is located above and to the left of the first position as shown in FIG. 5. This motion causes second projection 93 to move downwardly from a first position to a second position, thereby engaging latch actuation mechanism 94 and unlocking the door. Note that as this occurs, the inner edge of first opening 83 of second cam mechanism 80 engages projection 86 of biasing member 85 and rotates biasing member 85 clockwise, thereby stretching spring S. When handle 30 is released, second cam mechanism 80 will return to its unactuated position under the force of spring S.

As noted above, torsion spring TS biases safety latch mechanism 50 in the position shown in FIG. 3. Operation of handle 30 has no effect on the position of safety latch mechanism 50. However, if safety latch mechanism 50 experiences unintended force sufficient to overcome the biasing force of torsion spring TS, such as could occur during an accident, safety latch mechanism 50 will rotate about pins or posts 55 so as to position second end 53 in the path of travel of actuator mechanism 70. Tab or projection 75 of actuator mechanism 70 will engage second end 53 of safety latch mechanism 50, thereby preventing further movement of actuator mechanism 70. This in turn prevents full rotation of second cam mechanism 80, thereby preventing actuator arm 91 from rotating so as to engage latch actuation mechanism 94. Thus, the vehicle door will remain locked. Note that in certain embodiments of the invention, the force required to actuate door handle 30 manually exceeds that necessary to overcome the biasing force of torsion spring TS and to actuate safety latch mechanism 50. For example, in one embodiment of the present invention, approximately 13 G force is required to manually actuate handle 30 but only 3 G force is needed to overcome the biasing force of torsion spring TS and actuate safety latch mechanism 50.

Although the present invention has been shown and described in detail, the same is by way of example only and should not be taken as a limitation on the invention. Numerous modifications can be made to the embodiments disclosed without departing from the scope of the present invention.

What is claimed is:

1. A door handle and locking system, including:

a base;

a first latching mechanism, the first latching mechanism being movable from a latched position to an unlatched position;

a handle connected to the base, the handle being movable from a first position in which the first latching mechanism is in the latched position to a second position in which the first latching mechanism is in the unlatched position;

a safety latch mechanism movable from a first position to a second position, the safety latch mechanism having a body having a first end, a second end, a first post extending from the body, and a second post extending from the body, the first and second posts connecting the safety latch mechanism to the base such that the safety latch mechanism is rotatable about the first and second posts from the first position to the second position;

a first biasing member for biasing the safety latch mechanism in the first position when the handle is in the first position, the first biasing member having a biasing force;

the first latching mechanism having a first cam mechanism, an actuator mechanism, a second cam mechanism, and a rotary mechanism;

the first cam mechanism having a shaft having a projection extending therefrom;

the actuator mechanism having a first end having a first projection extending therefrom, a second end having a second projection extending therefrom, and a third projection, the actuator mechanism being movable from a first position in which the first latching mechanism is in the latched position to a second position in which the first latching mechanism is in the unlatched position;

the second cam mechanism having a first arm, a second arm, a first opening, a second opening, and a second biasing member having a projection extending into the first opening of the second cam mechanism;

a third biasing member for biasing the second biasing member in a first position when the handle is in the first positon;

the rotary mechanism having a latch actuation mechanism, an actuator arm having a first projection extending through the second opening in the second cam mechanism, and a second projection that engages the latch actuation mechanism;

wherein moving the handle from the first position to the second position rotates the first cam mechanism so as to move the projection of the first cam mechanism into contact with the first projection of the actuator mechanism, thereby moving the actuator mechanism from the first position to the second position so as to engage the second projection of the actuator mechanism with the first arm of the second cam mechanism, thereby rotating the second cam mechanism such that the second cam mechanism bears against the first projection of the actuator arm to rotate the actuator arm such that the second projection of the actuator arm engages the latch actuation mechanism to move the first latching mechanism from the latched position to the unlatched position; and wherein the safety latch mechanism remains in the first position upon movement of the handle from the first position to the second position.

2. The door handle and locking system according to claim 1, wherein applying force to the safety latch mechanism sufficient to overcome the biasing force of the first biasing member moves the safety latch mechanism from the first position to the second position.

3. The door handle and locking system according to claim 2, wherein applying force to the safety latch mechanism sufficient to overcome the biasing force of the first biasing member causes the safety latch mechanism to rotate about the first and second posts so as to position the second end of the safety latch mechanism so as to prevent movement of the actuator mechanism from the first position to the second position.

4. The door handle and locking system according to claim 3, wherein when the safety latch mechanism is in the second position, the third projection of the actuator mechanism engages the second end of the safety latch mechanism as the actuator mechanism moves from the first position to the second position.

5. The door handle and locking system according to claim 1, wherein the force required to move the handle from the first position to the second position is greater than the biasing force of the first biasing member.

6. The door handle and locking system according to claim 5, wherein the force required to move the handle from the first position to the second position is 13 G.

7. The door handle and locking system according to claim 5, wherein the biasing force of the first biasing member is 3 G.

8. The door handle and locking system according to claim 1, wherein the he handle has a first end and a second end, the first end being movable away from the base as the handle moves from the first position to the second position and the second end being movable toward the base as the handle moves from the first position to the second position.

9. The door handle and locking system according to claim 1, wherein the third projection of the actuator mechanism is located adjacent the second end of the actuator mechanism.

10. The door handle and locking system according to claim 1, wherein rotation of the second cam mechanism in response to movement of the handle from the first position to the second position rotates the second biasing member, which in turn applies force to the third biasing member.

11. The door handle and locking system according to claim 1, wherein the first and second posts of the safety latch mechanism are located closer to the second end of the safety latch mechanism than they are to the first end of the safety latch mechanism.

12. The door handle and locking system according to claim 1, wherein the mass of the safety latch mechanism between the first and second posts and the first end of the safety latch mechanism is greater than the mass of the safety latch mechanism between the first and second posts and the second end of the safety latch mechanism.

* * * * *